(12) United States Patent
Seol (10) Patent No.: US 12,065,117 B2
(45) Date of Patent: Aug. 20, 2024

(54) BRAKING DEVICE FOR VEHICLE AND BRAKING METHOD THEREFOR

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 287 days.

(21) Appl. No.: 17/504,554

(22) Filed: Oct. 19, 2021

(65) Prior Publication Data

US 2022/0169217 A1 Jun. 2, 2022

(30) Foreign Application Priority Data

Nov. 30, 2020 (KR) .................. 10-2020-0164136

(51) Int. Cl.
*B60T 13/74* (2006.01)
*B60T 8/176* (2006.01)
(Continued)

(52) U.S. Cl.
CPC .............. *B60T 8/176* (2013.01); *B60T 8/326* (2013.01); *B60T 13/686* (2013.01); *B60T 13/745* (2013.01); *B60T 17/04* (2013.01); *B60T 17/221* (2013.01); *B60T 2220/04* (2013.01); *B60T 2270/10* (2013.01); *B60T 2270/402* (2013.01);
(Continued)

(58) Field of Classification Search
CPC ...... B60T 13/686; B60T 13/74; B60T 13/745; B60T 13/662; B60T 8/176; B60T 8/326; B60T 17/04; B60T 17/221; B60T 2220/04; B60T 2270/10; B60T 2270/402; B60T 2270/404; B60T 2270/82; B60T 2270/88

See application file for complete search history.

(56) References Cited

U.S. PATENT DOCUMENTS

| 2016/0159332 A1* | 6/2016 | Yang ..................... B60T 8/4018 303/15 |
| 2016/0214589 A1* | 7/2016 | Seol ..................... B60T 8/4081 |

(Continued)

FOREIGN PATENT DOCUMENTS

| CN | 105691372 A | 6/2016 |
| CN | 108657154 A | 10/2018 |
| CN | 110667542 A | 1/2020 |

OTHER PUBLICATIONS

Office Action issued Jun. 3, 2023 in corresponding Chinese Patent Application No. 202111407871.1.

*Primary Examiner* — Bradley T King
(74) *Attorney, Agent, or Firm* — NovoTechIP International PLLC (57) ABSTRACT

According to at least one aspect, the present disclosure provides a braking device for a vehicle, the braking device comprising: an electronic control unit which controls a motor and a traction control valve and calculates a required pressure for braking a vehicle and a pressure in a main line, wherein the electronic control unit increases the pressure in the main line by applying a positive current to the motor when the required pressure is greater than the pressure in the main line and decreases the pressure in the main line by applying a negative current to the motor and opening the traction control valve when the required pressure is lower than or equal to the pressure in the main line.

8 Claims, 4 Drawing Sheets

(51) Int. Cl.
*B60T 8/32* (2006.01)
*B60T 13/68* (2006.01)
*B60T 17/04* (2006.01)
*B60T 17/22* (2006.01)

(52) U.S. Cl.
CPC ..... *B60T 2270/404* (2013.01); *B60T 2270/82* (2013.01); *B60T 2270/88* (2013.01)

(56) References Cited

U.S. PATENT DOCUMENTS

| | | | |
|---|---|---|---|
| 2016/0221559 A1* | 8/2016 | Kim | B60T 8/367 |
| 2017/0072927 A1* | 3/2017 | Jeon | B60T 7/042 |
| 2017/0072928 A1* | 3/2017 | Kim | B60T 11/20 |
| 2017/0158180 A1* | 6/2017 | Kim | B60T 13/662 |
| 2017/0210369 A1* | 7/2017 | Lim | B60T 13/04 |
| 2018/0126971 A1* | 5/2018 | Leiber | B60T 13/741 |
| 2018/0194337 A1* | 7/2018 | Leiber | B60T 7/042 |
| 2019/0359191 A1* | 11/2019 | Wagner | B60T 13/745 |
| 2020/0172064 A1* | 6/2020 | Yasui | B60T 8/17616 |
| 2020/0207320 A1* | 7/2020 | Plewnia | B60T 13/58 |
| 2022/0144236 A1* | 5/2022 | Koo | B60T 13/662 |

* cited by examiner

BRAKING DEVICE FOR VEHICLE AND BRAKING METHOD THEREFOR

CROSS-REFERENCE TO RELATED APPLICATIONS

This application claims priority to and the benefit of Korean Patent Application No. 10-2020-0164136, filed on Nov. 30, 2020, the disclosure of which is incorporated herein by reference in its entirety.

BACKGROUND OF THE INVENTION

1. Field of the Invention

The present disclosure relates to a braking device for a vehicle and a braking method of a vehicle.

2. Discussion of Related Art

The contents described here provide only background information and do not constitute the related art.

Generally, in an electro-hydraulic brake system, a pedal pressure of a driver is detected by a sensor, and a braking pressure of each wheel is adjusted using a hydraulic modulator. The electro-hydraulic brake system includes the sensor, a pedal simulator, and an electronic control unit. The sensor detects a stroke distance of a pedal to allow the driver to recognize a desired braking pressure, and the pedal simulator allows the driver to feel the pedal pressure like a general hydraulic brake system. The electronic control unit determines a desired braking force of the driver through a pedal stroke sensor, a pressure sensor, and the like and drives an additional wheel brake mechanism to generate a braking force in a wheel brake.

The wheel brake mechanism generally includes a main master cylinder structure for generating hydraulic pressure and a hydraulic circuit and a plurality of valves for transmitting the hydraulic pressure generated by the main master to the wheel brake of a vehicle.

In the wheel brake mechanism, when the hydraulic pressure generated in the hydraulic circuit decreases, a method of opening an outlet valve and collecting a brake fluid in a reservoir is generally used.

However, in the method of opening the outlet valve and collecting the brake fluid, there are limitations in which a great deal of noise is generated, and a wheel pressure generated in the wheel brake should be estimated to decrease a pressure.

BRIEF SUMMARY OF THE INVENTION

The present disclosure is mainly directed to decreasing a pressure by operating a first traction control valve, a second traction control valve, a second back-up valve, and a fourth back-up valve to decrease noise and improve the accuracy of a decrease in pressure without using an outlet valve when the pressure in a hydraulic circuit is decreased.

According to at least one aspect, the present disclosure provides a braking device for a vehicle, which includes a reservoir, a plurality of wheel brake apparatuses, a back-up master cylinder, a main master cylinder, and a motor, the braking device comprising: a main line through which hydraulic pressure is transmitted between the main master cylinder and the plurality of wheel brake apparatuses; a traction control valve disposed on the main line and formed to control opening and closing of the main line; and an electronic control unit which controls the motor and the traction control valve and calculates a required pressure for braking a vehicle and a pressure in the main line, wherein the electronic control unit increases the pressure in the main line by applying a positive current to the motor when the required pressure is greater than the pressure in the main line and decreases the pressure in the main line by applying a negative current to the motor and opening the traction control valve when the required pressure is lower than or equal to the pressure in the main line.

According to the present embodiment described above, there is an effect in that a pressure decreases by operating a first traction control valve, a second traction control valve, a second back-up valve, and a fourth back-up valve to decrease noise and improve the accuracy of a decrease in pressure without using an outlet valve when the pressure in a hydraulic circuit is decreased.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE INVENTION

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof FIG. 1 is a hydraulic circuit diagram illustrating a braking device according to one embodiment of the present disclosure.

Figure 1:
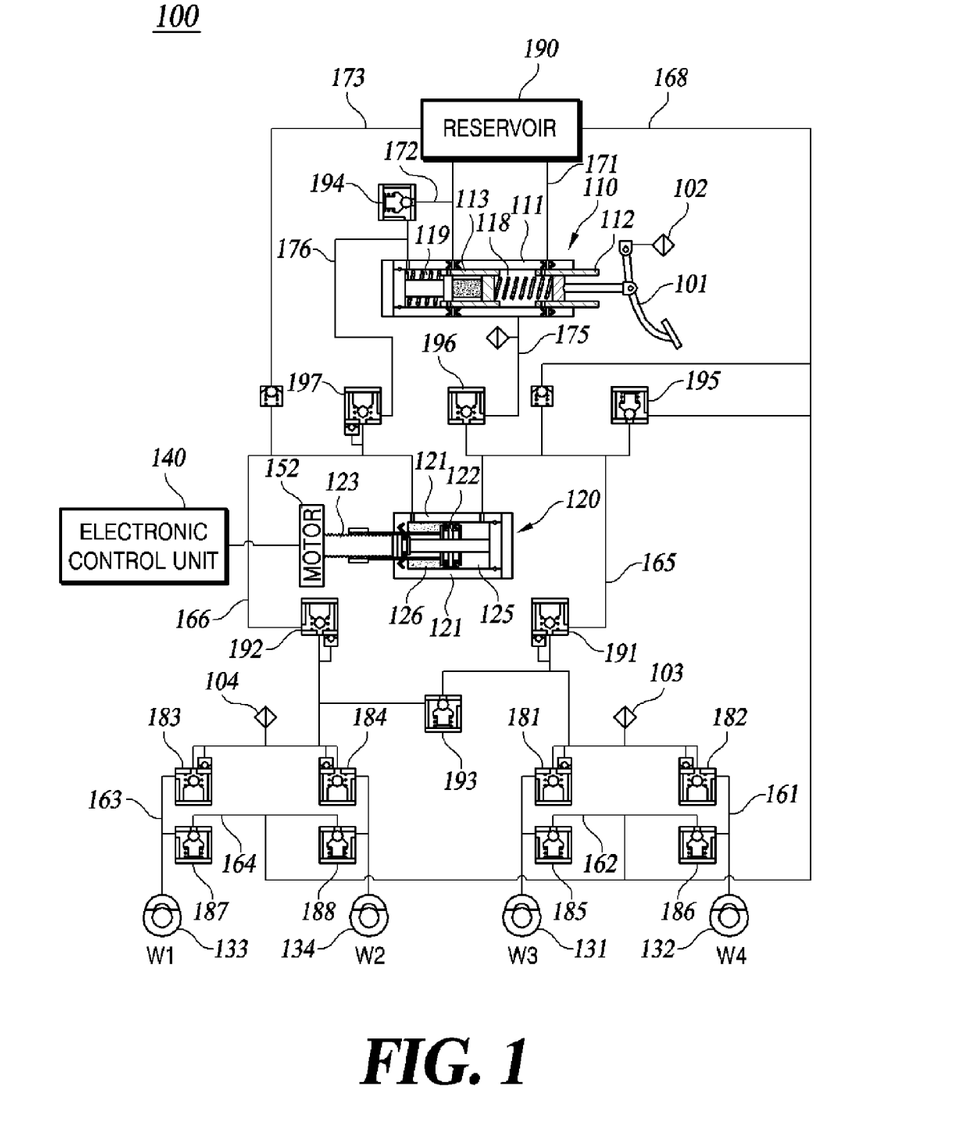
FIG. 1 is a hydraulic circuit diagram illustrating a braking device according to one embodiment of the present disclosure.

Referring to FIG. 1, a braking device 100 for a vehicle according to the embodiment of the present disclosure includes at least a back-up master cylinder 110, a main master cylinder 120, wheel brakes 131, 132, 133 and 134, an electronic control unit (ECU) 140, and a motor 152.

The back-up master cylinder 110 includes all or some of a back-up body 111, a first back-up piston 112, a second back-up piston 113, a first back-up chamber 118, and a second back-up chamber 119.

The back-up body 111 is formed in a structure of which an inner portion is empty. The first back-up piston 112 and the second back-up piston 113 are disposed in an inner space of the back-up body 111 to be linearly movable in a lateral direction. The inner space of the back-up body 111 is divided into the first back-up chamber 118 corresponding to a space between the first back-up piston 112 and the second back-up piston 113 and the second back-up chamber 119 positioned at a left side of the first back-up chamber 118.

The main master cylinder 120 is driven by the motor 152 controlled by the ECU 140, generates hydraulic pressure in main chambers 125 and 126, and provides the hydraulic pressure to the wheel brakes 131, 132, 133 and 134. In this case, the ECU 140 may be an ECU which is a typical control unit of a vehicle. When a driver depresses a brake pedal 101, a stroke sensor 102 detects a stroke of the brake pedal 101 and transmits the stroke to the ECU 140, and the ECU 140 controls the hydraulic pressure generated in the main master cylinder 120 by controlling the motor 152 based on the stroke, which is detected by the stroke sensor 102, of the brake pedal 101.

The main master cylinder 120 includes a main body 121, a main piston 122, and a rod 123.

The main body 121 is formed in a structure of which an inner portion is empty. The main piston 122 is disposed in an inner space of the main body 121 to be linearly movable in the lateral direction. The inner space of the main body 121 is divided into two spaces, which include a first main chamber 125 that is a space disposed at a right side with respect to the main piston 122 and a second main chamber 126 that is a space disposed at a left side with respect to the main piston 122, by the main piston 122.

In the present specification, the terms "left side" and "right side" are only for indicating directions in which components are illustrated in the drawings, and the contents of the present disclosure are not interpreted as being limited to the arrangement directions and positions thereof.

When the main piston 122 moves forward in a right direction, the first main chamber 125 becomes narrower, and the second main chamber 126 becomes wider. Conversely, when the main piston 122 moves rearward in a left direction, the first main chamber 125 becomes wider, and the second main chamber 126 becomes narrower.

The wheel brakes 131, 132, 133 and 134 include a first wheel brake 131 which brakes a front left wheel of the vehicle, a second wheel brake 132 which brakes a front right wheel of the vehicle, a third wheel brake 133 which brakes a rear right wheel vehicle of the vehicle, and a fourth wheel brake 134 which brakes a rear left wheel of the vehicle. In the present disclosure, the front, rear, left, or right wheel brake may be changed within a range of a technical level of those skilled in the art.

Coupling relationships between the back-up master cylinder 110, the main master cylinder 120, and the wheel brakes 131, 132, 133 and 134 will be described.

The first wheel brake 131 and the second wheel brake 132 are connected through a first brake line 161. That is, one end of the first brake line 161 is connected to the first wheel brake 131, and the other end thereof is connected to the second wheel brake 132.

A first inlet valve 181 and a second inlet valve 182 which open or close the first brake line 161 are installed on the first brake line 161. The first inlet valve 181 is disposed adjacent to the first wheel brake 131, and the second inlet valve 182 is disposed adjacent to the second wheel brake 132.

One end of a first collection line 162 is connected to the first brake line 161 corresponding to a line between the first wheel brake 131 and the first inlet valve 181. In addition, the other end of the first collection line 162 is connected to the first brake line 161 corresponding to a line between the second wheel brake 132 and the second inlet valve 182.

A first outlet valve 185 and a second outlet valve 186 which open or close the first collection line 162 are installed on the first collection line 162. The first outlet valve 185 is disposed adjacent to one end of the first collection line 162, and the second outlet valve 186 is disposed adjacent to the other end of the first collection line 162.

The third wheel brake 133 and the fourth wheel brake 134 are connected through a second brake line 163. That is, one end of the second brake line 163 is connected to the third wheel brake 133, and the other end thereof is connected to the fourth wheel brake 134.

A third inlet valve 183 and a fourth inlet valve 184 which open or close the second brake line 163 are installed on the second brake line 163. The third inlet valve 183 is disposed adjacent to the third wheel brake 133, and the fourth inlet valve 184 is adjacent to the fourth wheel brake 134.

A check valve (not shown), which prevents a reverse flow of a brake fluid, is installed each of the first inlet valve 181, the second inlet valve 182, the third inlet valve 183, and the fourth inlet valve 184.

Meanwhile, a first pressure sensor 103 is installed on the first brake line 161 corresponding to a line between the first inlet valve 181 and the second inlet valve 182, and a second pressure sensor 104 is installed on the second brake line 163 corresponding to a line between the third inlet valve 183 and the fourth inlet valve 184.

One end of a second collection line 164 is connected to the second brake line 163 corresponding to a line between the third wheel brake 133 and the third inlet valve 183. In addition, the other end of the second collection line 164 is connected to the second brake line 163 corresponding to a line between the fourth wheel brake 134 and the fourth inlet valve 184. A third outlet valve 187 and a fourth outlet valve 188 which open or close the second collection line 164 are installed on the second collection line 164. The third outlet valve 187 is disposed adjacent to one end of the second collection line 164, and the fourth outlet valve 188 is disposed adjacent to the other end of the second collection line 164.

One end of a first main line 165 is connected to the first main chamber 125. That is, one end of the first main line 165 is connected to the main body 121 so as to fluidly communicate with the first main chamber 125. The other end of the first main line 165 is connected to the first brake line 161 corresponding to the line between the first inlet valve 181 and the second inlet valve 182.

A first traction control valve 191 which opens or closes the first main line 165 is installed on the first main line 165. The first traction control valve 191 may be a solenoid valve controlled by the ECU 140 to open or close the first main line 165 and may be installed on a line through which the hydraulic pressure of the first main chamber 125 is supplied to each of the wheel brakes 131, 132, 133 and 134.

One end of a second main line 166 is connected to the second main chamber 126. That is, one end of the second main line 166 is connected to the main body 121 so as to fluidly communicate with the second main chamber 126. In addition, the other end of the second main line 166 is connected to the second brake line 163 corresponding to the line between the third inlet valve 183 and the fourth inlet valve 184.

A second traction control valve 192 which opens or closes the second main line 166 is installed on the second main line 166. The second traction control valve 192 is a solenoid valve controlled by the ECU 140 to open or close the second main line 166 and is installed on a line through which the hydraulic pressure of the second main chamber 126 is supplied to each of the wheel brakes 131, 132, 133 and 134.

One end of a combined line is connected to the first main line 165. In addition, the other end of the combined line is connected to the second main line 166. A mixing valve 193 which opens or closes the combined line is installed on the combined line.

One end of a first back-up line 171 is connected to the first back-up chamber 118, and the other end of the first back-up line 171 is connected to the second back-up chamber 119. That is, one end of the first back-up line 171 is connected to the back-up body 111 so as to fluidly communicate with the first back-up chamber 118, and the other end thereof is connected to the back-up body 111 so as to fluidly communicate with the second back-up chamber 119. A reservoir 190 in which a brake fluid is stored is installed on the first back-up line 171.

One end of a third collection line 168 is connected to the reservoir 190. In addition, the other end of the third collection line 168 branches into two lines, one line is connected to the first collection line 162 corresponding to a line between the first outlet valve 185 and the second outlet valve 186, and the other one line is connected to the second collection line 164 corresponding to a line between the third outlet valve 187 and the fourth outlet valve 188.

One end of a second back-up line 172 is connected to the second back-up chamber 119. That is, one end of the second back-up line 172 is connected to the back-up body 111 so as to fluidly communicate with the second back-up chamber 119. The other end of the second back-up line 172 is connected to the first back-up line 171 corresponding to a line between the reservoir 190 and the back-up body 111.

A first back-up valve 194 which opens or closes the second back-up line 172 is installed on the second back-up line 172.

One end of a fifth back-up line 175 is connected to the first back-up chamber 118. That is, one end of the fifth back-up line 175 is connected to the back-up body 111 so as to fluidly communicate with the first back-up chamber 118. In addition, the other end of the fifth back-up line 175 is connected to the main body 121. A third back-up valve 196 which opens or closes the fifth back-up line 175 is installed on the fifth back-up line 175. In addition, a pressure sensor (not shown) which measures a brake fluid pressure in the fifth back-up line 175 is installed on the fifth back-up line 175. The pressure sensor is installed on the fifth back-up line 175 corresponding to a line between the back-up body 111 and the third back-up valve 196.

One end of a sixth back-up line 176 is connected to the second back-up chamber 119. That is, one end of the sixth back-up line 176 is connected to the back-up body 111 so as to fluidly communicate with the second back-up chamber 119. In addition, the other end of the sixth back-up line 176 is connected to the second main line 166 corresponding to a line between one end of the second main line 166 and the other end of a third back-up line 173. A fourth back-up valve 197 which opens or closes the sixth back-up line 176 is installed on the sixth back-up line 176.

The first inlet valve 181 to the fourth inlet valve 184, the first outlet valve 185 to the fourth outlet valve 188, the first traction control valve 191 and the second traction control valve 192, the mixing valve 193, and the first back-up valve 194 to the fourth back-up valve 197 are formed as solenoid valves controlled by the ECU 140.

Each of the first inlet valve 181, the second inlet valve 182, the third inlet valve 183, and the fourth inlet valve 184 is formed as a normally open type which is normally open when a control signal is not input from the ECU 140.

In addition, each of the first outlet valve 185, the second outlet valve 186, the third outlet valve 187, and the fourth outlet valve 188 is formed as a normal closed type which is normally closed when a control signal is not input from the ECU 140.

Each of the first traction control valve 191 and the second traction control valve 192 is formed as a normally open type. In addition, the mixing valve 193 is formed as a normal closed type.

The first back-up valve 194 is formed as a normal closed type. In addition, each of the second back-up valve 195, the third back-up valve 196, and the fourth back-up valve 197 is formed as a normally open type.

When a brake of the vehicle is controlled by the ECU 140, the ECU 140 closes all of the second back-up valve 195, the third back-up valve 196, and the fourth back-up valve 197. Then, since all of the first, second, third, fourth back-up valves 194, 195, 196, and 197 are in closed states, a line between the back-up master cylinder 110 and the main master cylinder 120 is blocked. Accordingly, in this case, the wheel brakes 131, 132, 133 and 134 generate braking forces using only hydraulic pressure supplied by the main master cylinder 120.

However, when power is not supplied to the ECU 140, the second back-up valve 195, the third back-up valve 196, and the fourth back-up valve 197 maintain open states because of being formed as normally open types.

In addition, in the case in which power is not supplied to the ECU 140, when the driver depresses the brake pedal 101, the hydraulic pressure generated in the second back-up chamber 119 by receiving a brake fluid supplied from the reservoir 190 is supplied to the second main chamber 126 through the sixth back-up line 176.

The fourth back-up valve 197 is formed on the sixth back-up line 176 which connects the back-up master cylinder 110 and the main master cylinder 120. When the ECU 140 breaks down, the fourth back-up valve 197 is configured to generate a braking force using the back-up master cylinder 110, and for example, the fourth back-up valve 197 is formed as a normal open type in which an open state is maintained even when a current is not supplied.

Figure 2:
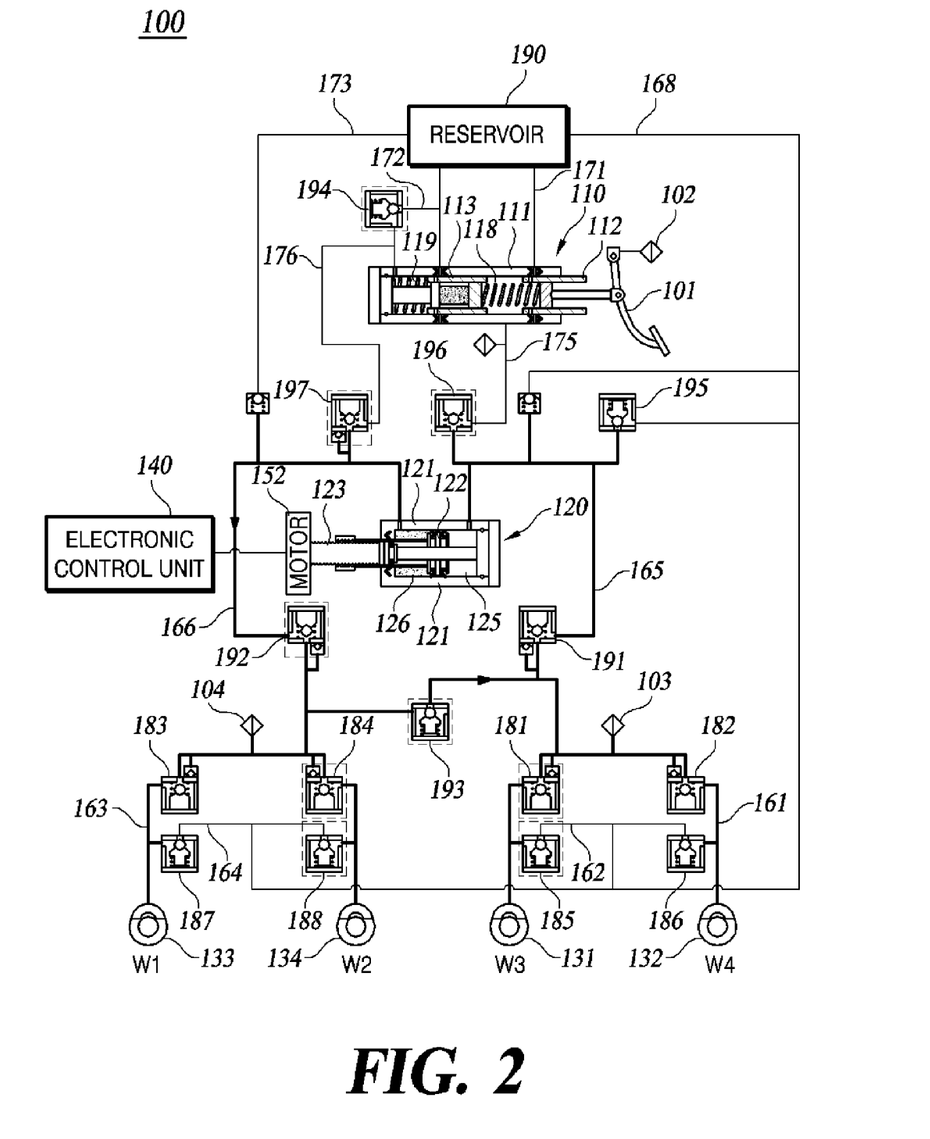
FIG. 2 is a hydraulic circuit diagram illustrating a flow of a brake fluid in order for an electronic control unit according to one embodiment of the present disclosure to increase or decrease a pressure in the hydraulic circuit in an anti-lock brake system (ABS) situation.

FIG. 2 is a hydraulic circuit diagram illustrating a flow of a brake fluid in order for the ECU according to one embodiment of the present disclosure to increase or decrease a pressure in the hydraulic circuit in an anti-lock brake system (ABS) situation.

Referring to FIG. 2, a thick solid line shows a flow of a brake fluid.

In a state in which a pressure in the hydraulic circuit is greater than a required pressure for braking the vehicle and is increasing, the ECU 140 applies a negative current which is relatively lower than a base current in order to decrease the pressure in the hydraulic circuit.

Meanwhile, in a state in which, although a pressure in the hydraulic circuit is not greater than the required pressure for braking the vehicle but is decreasing, the ECU 140 applies a positive current which is relatively higher than the base current in order to increase the pressure in the hydraulic circuit.

In this case, the base current is a current suppled to the motor 152 in order to move the main piston 122 in a forward direction. Accordingly, when the positive current flows in the motor 152, the piston may move forward or rearward with a greater force to further increase the pressure in the hydraulic circuit. Meanwhile, when the negative current flows in the motor, the piston moves forward or rearward with a smaller force to decrease the pressure in the hydraulic circuit.

In addition, the ECU 140 may apply a current to the first inlet valve 181, the first outlet valve 185, the fourth inlet valve 184, and the fourth outlet valve 188 to decrease or increase a pressure so as to prevent the wheel from being locked based on a pressure state of the wheel.

Figure 3:
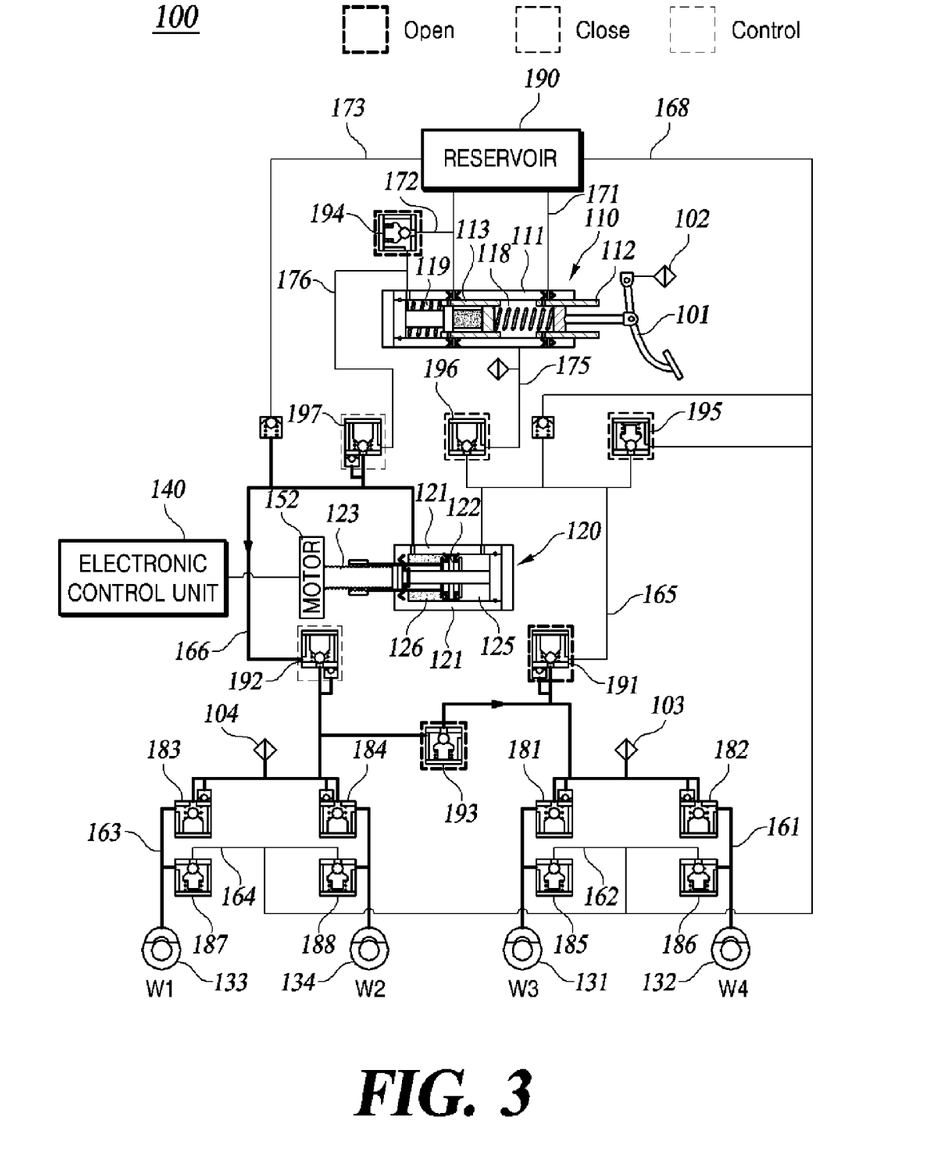
FIG. 3 is a hydraulic circuit diagram for describing a solenoid valve which operates when the electronic control unit according to one embodiment of the present disclosure decreases a pressure in the hydraulic circuit in a first stage pressure increase process and in a second stage pressure increase process.

FIG. 3 is a hydraulic circuit diagram for describing a solenoid valve which operates when the ECU according to one embodiment of the present disclosure decreases a pressure in the hydraulic circuit in a first stage pressure increase process and in a second stage pressure increase process.

When a pressure in the hydraulic circuit is increasing, there are the low pressure increase process and the high pressure increase process.

A low pressure increase mode (alternatively referred to as the first stage pressure increase process) denotes a process in which the motor 152 rotates to move the main piston 122 in the forward direction (right direction of FIG. 2), and a brake fluid in the first main chamber 125 is discharged to the first brake line 161 and the second brake line 163 through the first main line 165.

Meanwhile, a high pressure increase mode (alternatively referred to as the second stage pressure increase process) denotes a process in which the motor 152 rotates in an opposite direction to move the main piston 122 in a rearward direction (leftward direction in FIG. 2) and a brake fluid in the second main chamber 126 is discharged to the first brake line 161 and the second brake line 163 through the second main line 166 in order to generate a greater hydraulic pressure after the first stage pressure increase process is performed.

In the low pressure increase mode, since the main piston 122 is in a forward moving state, the ECU 140 should open the first traction control valve 191 to switch the main piston 122 to a rearward moving state. Accordingly, the ECU 140 opens the first traction control valve 191 to switch the main piston 122 to the rearward moving state by not applying a current to the first traction control valve 191.

In addition, the ECU 140 applies a current to the fourth back-up valve 197 and the second traction control valve 192 based on a required pressure for braking the vehicle. Accordingly, a brake fluid passes through the second traction control valve 192, the fourth back-up valve 197, and the first back-up valve 194 and is collected in the reservoir 190. That is, the main piston 122 moves rearward, the brake fluid is collected in the reservoir 190, and a pressure in the hydraulic circuit decreases.

Meanwhile, in the high pressure increase mode, since the main piston 122 is in a rearward moving state, the ECU 140 should open the second traction control valve 192 to switch the main piston 122 to a forward moving state. Accordingly, the ECU 140 opens the second traction control valve 192 to switch the main piston 122 in the forward moving state by not applying a current to the second traction control valve 192.

In addition, the ECU 140 applies a current to the second back-up valve 195 and the first traction control valve 191 based on a required pressure for braking the vehicle. Accordingly, a brake fluid passes through the first traction control valve 191 and the second back-up valve 195 and is collected in the reservoir 190. That is, the main piston 122 moves forward, the brake fluid is collected in the reservoir 190, and a pressure of the hydraulic circuit decreases.

Figure 4:
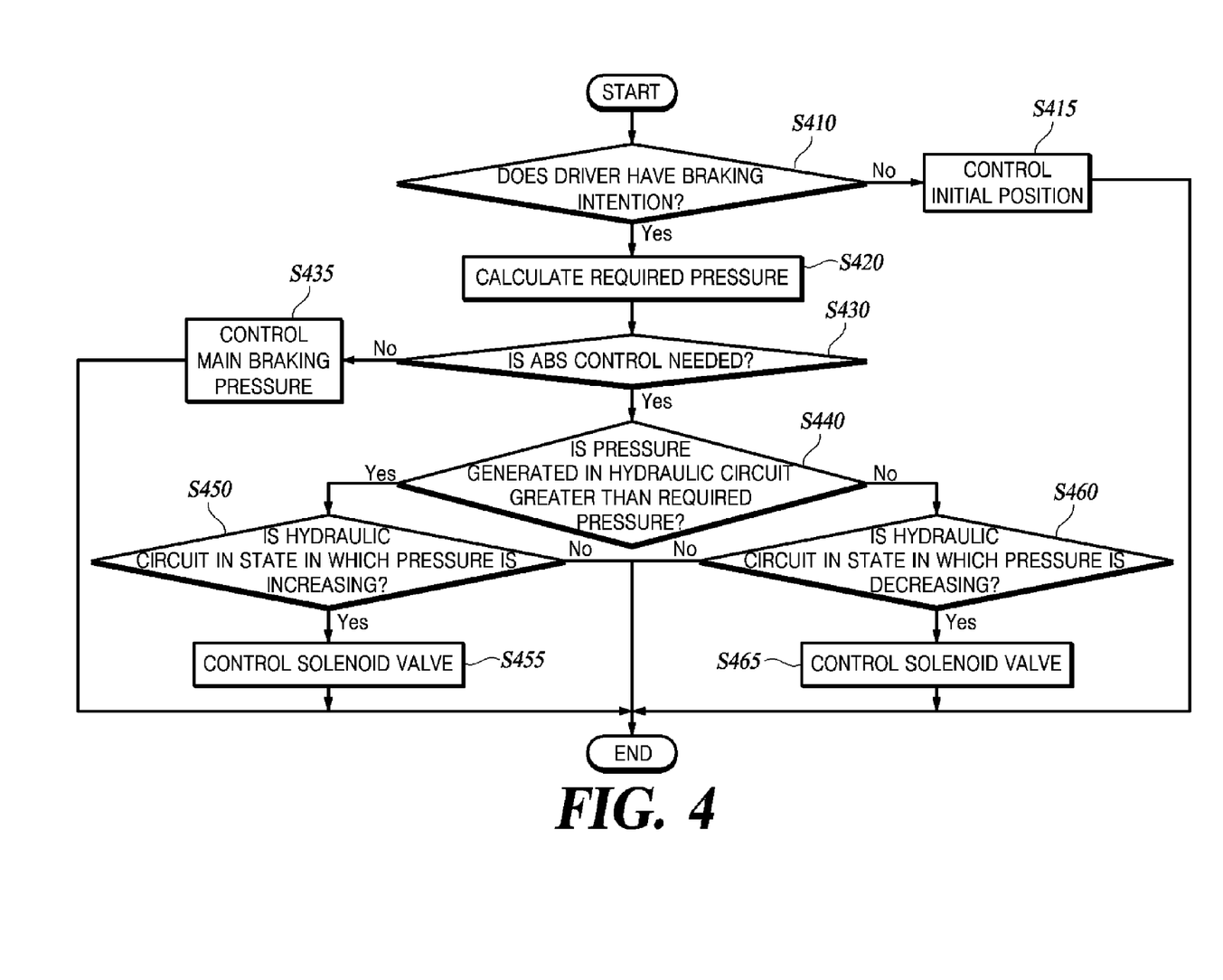
FIG. 4 is a flowchart illustrating a control process when the electronic control unit according to one embodiment of the present disclosure increases or decreases a pressure.

FIG. 4 is a flowchart illustrating a control process when the ECU according to one embodiment of the present disclosure increases or decreases a pressure.

Referring to FIG. 4, the ECU 140 determines whether the driver has a braking intention (S410). The braking intention may be determined based on a stroke, which is detected by the pedal stroke sensor 102, of the brake pedal 101. However, the present disclosure is not limited thereto. For example, the braking intention may be a signal generated by an ECU to control braking of a vehicle in a case in which the ECU automatically controls driving of the vehicle through, for example, autonomous driving or smart cruise control.

When it is determined that the driver does not have a braking intention, the ECU 140 performs initial position control, that is, piston initialization (S415).

On the other hand, when it is determined that the driver has a braking intention, the ECU 140 calculates a pressure needed for generating a braking force required by the driver, that is, a required pressure (S420). For example, the ECU 140 may calculate a required pressure for braking the vehicle based on stroke information, which is detected by the stroke sensor 102, of the brake pedal.

When the required pressure for braking the vehicle is calculated, the ECU 140 determines whether ABS control is needed for the vehicle when the braking force required by the driver is generated (S430). In this case, the ABS control is a function of preventing the wheel from slipping when the vehicle is braked so that the driver does not lose control of a steering force, and preventing the wheel from locking to decrease a braking distance.

Whether the ABS control is needed may be determined based on, for example, a traveling speed of the vehicle. In a case in which a traveling speed is greater than or equal to a predetermined speed, and the driver brakes suddenly, since the wheel may slip, the ECU 140 may determine that the ABS control is needed.

When it is determined that the ABS control is not needed, the ECU 140 performs main braking pressure control (S435). The main braking pressure control denotes a general control process in which the ECU 140 generates a braking force in the vehicle when a pressure is generated in the hydraulic circuit to brake the vehicle without performing the ABS control. Since the control process in which the ECU 140 drives the motor 152 to generate hydraulic pressure in the main master cylinder 120 is clear to those skilled in the art, a detailed description thereof will be omitted.

On the other hand, when it is determined that the ABS control is needed, the ECU 140 determines whether a pressure generated in the hydraulic circuit is greater than the required pressure (S440). The required pressure for braking the vehicle is a pressure calculated in operation S420, and the pressure generated in the hydraulic circuit is a pressure calculated based on pressure information detected by the first pressure sensor 103 or the second pressure sensor 104.

When the pressure generated in the hydraulic circuit is greater than the required pressure for braking the vehicle, the ECU 140 determines whether the pressure in the hydraulic circuit is in an increasing state (S450).

When it is determined that the pressure in the hydraulic circuit is increasing, the ECU 140 controls the first traction control valve 191, the second traction control valve 192, the second back-up valve 195, and the fourth back-up valve 197 to decrease the pressure in the hydraulic circuit (S455). When it is determined that the pressure in the hydraulic circuit is not increasing, the ECU 140 does not open the first traction control valve 191 and the second traction control valve 192.

Hereinafter, operation S455 will be described in more detail.

In the case in which the pressure in the hydraulic circuit is greater than the required pressure for braking the vehicle, the pressure in the hydraulic circuit needs to be decreased. When it is determined that the pressure in the hydraulic circuit is greater than the required pressure for braking the vehicle and is increasing, that is, in operation S455, a specific solenoid valve should be opened to decrease the pressure in the hydraulic circuit.

In order to decrease the pressure in the hydraulic circuit, the ECU 140 may operate the outlet valves 185, 186, 187, and 188 to decrease the pressure, but when the outlet valves 185, 186, 187, and 188 are operated, there are problems in that a great deal of noise is generated, and a wheel pressure generated in each of the wheel brakes 131, 132, 133 and 134 should be estimated.

Accordingly, the ECU 140 according to one embodiment of the present disclosure operates the first traction control valve 191, the second traction control valve 192, the second back-up valve 195, and the fourth back-up valve 197 to decrease the pressure without using the outlet valves 185, 186, 187, and 188.

In addition, the ECU 140 applies a negative current to the motor 152 in order to decrease the pressure in the hydraulic circuit.

In operation S455, when the pressure in the hydraulic circuit is increasing, there are a low pressure increase process and a high pressure increase process. In each of the processes, a method of controlling a solenoid valve to decrease the pressure in the hydraulic circuit will be described with reference to FIG. 3.

On the other hand, in operation S450, when the pressure in the hydraulic circuit is not increasing, the present algorithm is finished.

Hereinafter, in operation S440, a case in which a required pressure for braking the vehicle is greater than a pressure generated in the hydraulic circuit will be described.

When it is determined that the required pressure for braking the vehicle is greater than the pressure generated in the hydraulic circuit, the ECU 140 determines whether the pressure in the hydraulic circuit is decreasing (S460).

When it is determined that the pressure in the hydraulic circuit is decreasing, the ECU 140 controls the first traction control valve 191, the second traction control valve 192, and the fourth back-up valve 197 to increase the pressure in the hydraulic circuit (S465).

In addition, the ECU 140 applies a positive current to the motor 152 to increase the pressure in the hydraulic circuit.

In operation S465, a higher current is supplied to the first traction control valve 191, the second traction control valve 192, and the fourth back-up valve 197 in order to prevent a sudden drop in the hydraulic circuit. In this case, the drop means that the pressure generated in the hydraulic circuit is released by momentarily switching the solenoid valve, which maintains a closed state, to an open state. That is, in a drop state, even when the motor rotates, since a brake fluid is collected in the reservoir 190, the hydraulic pressure in the hydraulic circuit is not increased.

Accordingly, the ECU 140 according to one embodiment of the present disclosure supplies a higher current to the solenoid valve described above so that the drop does not occur in operation S465. That is, a duty ratio is increased to supply a higher current.

In addition, the ECU 140 may switch the low pressure increase process to the high pressure increase process in order to increase a pressure in the hydraulic circuit. At a switching time point, a rotation direction of the motor may be changed to drive the piston in an opposite direction.

Meanwhile, in operation S460, when it is determined that the pressure in the hydraulic circuit is not decreasing, the ECU 140 finishes the present algorithm.

After operations S435, S455, S465, and S415 are performed, the present algorithm is finished.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A braking device for a vehicle including a reservoir, a wheel brake apparatus, a back-up master cylinder, a main master cylinder, and a motor, the braking device comprising:
   a main line configured to transmit a hydraulic pressure between the main master cylinder and the wheel brake apparatus;
   a traction control valve, which is configured to be a normally open valve in absence of current being applied thereto, disposed on the main line and configured to control opening and closing of the main line; and
   an electronic control unit configured to control the motor and the traction control valve and calculate a required pressure for braking the vehicle and for the hydraulic pressure in the main line,
   wherein the electronic control unit is configured to:
      increase the hydraulic pressure in the main line by applying a first current to the motor when the required pressure for braking the vehicle is greater than the hydraulic pressure in the main line; and
      decrease the hydraulic pressure in the main line by applying a second current to the motor, different from the first current, and opening the traction control valve in absence of application of current thereto when the required pressure for braking the vehicle is lower than or equal to the hydraulic pressure in the main line,
   wherein:
   the main line includes a first main line and a second main line,
   the traction control valve includes:
      a first traction control valve disposed on the first main line; and a second traction control valve disposed on the second main line and configured to control opening and closing of the second main line, the main master cylinder includes a main piston configured to divide an inner space of the main master cylinder into a first main chamber and a second main chamber, when the motor moves the main piston in a forward direction, the first main chamber becomes narrower and the second main chamber becomes wider, when the motor moves the main piston in a rearward direction, the first main chamber becomes wider and the second main chamber becomes narrower, the electronic control unit is further configured to control the motor to perform:
- a low pressure increase process including decreasing a volume of the first main chamber and increasing the hydraulic pressure in the main line; and
- a high pressure increase process including increasing the volume of the first main chamber and the hydraulic pressure in the main line; and the electronic control unit is further configured to:

determine whether the hydraulic pressure in the main line is increasing at a time when the required pressure for braking the vehicle is lower than or equal to the hydraulic pressure in the main line;

in response to determining that the hydraulic pressure in the main line is increasing at a time when the motor performs the low pressure increase process, open the first traction control valve;

in response to determining that the hydraulic pressure in the main line is increasing at a time when the motor performs the high pressure increase process, open the second traction control valve; and in response to determining that the hydraulic pressure in the main line is not increasing, maintain the first and second traction control valves closed.

2. The braking device of claim 1, wherein:
the back-up master cylinder includes a stroke sensor configured to detect a stroke; and
the electronic control unit is further configured to calculate the required pressure for braking the vehicle based on the detected stroke.

3. The braking device of claim 1, wherein:
the first main line includes a first pressure sensor configured to detect a hydraulic pressure in the first main line, and
the electronic control unit is further configured to calculate the hydraulic pressure in the main line based on the hydraulic pressure detected by the first pressure sensor.

4. The braking device of claim 1, wherein:
the second main line includes a second pressure sensor configured to detect a hydraulic pressure in the second main line, and
the electronic control unit is further configured to calculate the hydraulic pressure in the main line based on the hydraulic pressure detected by the second pressure sensor.

5. The braking device of claim 1, further comprising a mixing valve located on a combined line connecting the first main line and the second main line.

6. The braking device of claim 5, wherein the mixing valve is configured to be normally closed in absence of current being applied thereto.

7. The braking device of claim 1, wherein the electronic control unit is further configured to determine whether anti-lock braking (ABS) control needs to be activated to prevent a wheel of the vehicle from slipping.

8. The braking device of claim 1, wherein the braking device further comprises an outlet valve coupled to a brake line located between the traction control valve and the wheel brake apparatus, and wherein the electronic control unit is configured to decrease the hydraulic pressure in the main line by opening the traction control valve without opening the outlet valve.

* * * * *